J. F. SHERLOCK & H. SPENGLER.
AMUSEMENT DEVICE.
APPLICATION FILED SEPT. 10, 1909.

1,070,546.

Patented Aug. 19, 1913.

UNITED STATES PATENT OFFICE.

JOHN F. SHERLOCK AND HENRY SPENGLER, OF NEW YORK, N. Y., ASSIGNORS TO HANSON ROBINSON, OF DETROIT, MICHIGAN.

AMUSEMENT DEVICE.

1,070,546.

Specification of Letters Patent.    Patented Aug. 19, 1913.

Application filed September 10, 1909.   Serial No. 517,053.

*To all whom it may concern:*

Be it known that we, JOHN F. SHERLOCK and HENRY SPENGLER, residing at New York, in the county and State of New York, have invented certain new and useful Improvements in Amusement Devices, of which the following is a specification.

This invention relates to amusement devices, and particularly to amusement devices which can be utilized in an educational way, as for the teaching of geography.

One of the objects of the invention is to provide a hollow body, as a globe, within which is freely movable a magnet, so disposed that it maintains a constant relation to the wall of the body, and a keeper for said magnet formed into or having secured thereto the simulation of some object, as for instance a ship, sliding upon the outside of the globe as the magnet is caused to move relatively thereto.

Another object of the invention is to provide a new and particularly advantageous form of support for the magnet, whereby the action of the device is rendered especially sensitive, the cost of manufacture minimized, and difficulty of assembling and of maintaining in operative assembled relation obviated.

A further object, where the device is intended to show the movements of a ship traveling from point to point upon the water-covered part of the earth's surface, is to furnish the simulant globe with land portions in relief; or by some other means to prevent the traveling keeper from moving over portions of the globe surface incongruous with the supposed character of the former.

Other objects and aims of the invention, together with inherent advantages thereof, will be in part obvious and in part specifically adverted to in the course of the following description, wherein the elements, combinations and arrangements of parts constituting the invention will be fully set forth, after which the scope of the application thereof will be defined in the appended claims.

Figure 1:
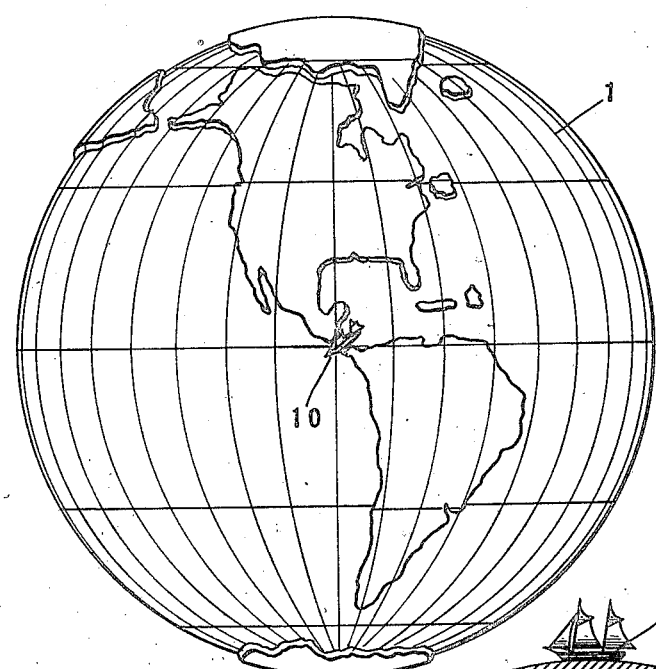
Figure 2:
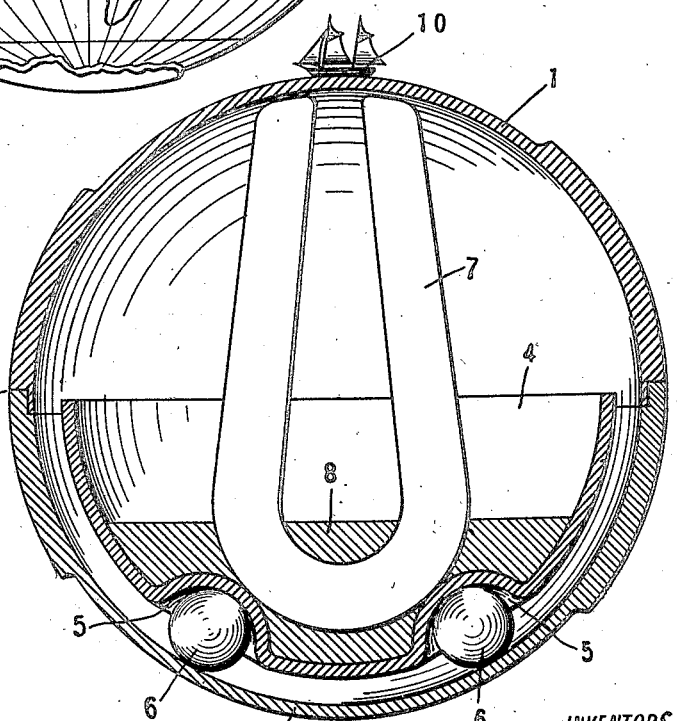

In the accompanying drawings, which are to be taken as a part of this specification, and in which we have illustrated a merely preferred form of embodiment of the invention; Figure 1 is a view of a geographical globe embodying the invention, looking down upon the same; and Fig. 2 is a central section through the same.

Referring to the numerals on the drawings, 1 and 2 indicate hemispheres which may be united by an overlapping joint 3 to form a globe. The outside of said globe is preferably covered with a representation of the earth's surface, exhibiting the oceans, continents, &c.

4 indicates a supporting member which is hemispherical if the hollow body is a globe, as just described. For the sake of stability the member 4 may be of but little smaller diameter than the globe, and when it is in position, as shown in Fig. 2, it is concentric with the globe. A series, preferably four, of pockets 5 is formed in the member 4, to receive anti-friction rollers 6, or the like, through which member 4 bears on the inner wall of the globe. The function of member 4 is to act as a support for a magnet 7, preferably a horse-shoe magnet, which is best carried with its bent portion rigidly secured in a mass 8 of lead or other non-magnetic material held within the supporting member, which serves also as ballast and to keep the supporting member 4 always at the bottom of the globe; and with its poles extending very nearly to the opposite inner wall of the globe, the ends of the poles being shaped conformably to said wall. The best disposition of the magnet appears to be the one shown, that is, centrally of its support and therefore diametrically of the globe.

It will be evident that if the globe be turned in any direction the member 4, because of its own weight and that of the ballast it carries, will tend to remain at the bottom of the globe, the balls 6 sliding or rolling over the inner wall thereof. Consequently the active end of the magnet will move in a corresponding path always opposite of member 4.

It is evident that, the globe, member 4, ballast, &c., all being of non-magnetic material, if a suitable magnetizable object 10 be placed outside the globe opposite the poles of the magnet, it will be held by the attraction of the latter, and as the globe is turned the magnetized object will slide over its surface, held in its approximate relation to the magnet. Accordingly, by proper manipulation of the globe the magnetized object may be given the appearance of movement over the globe. In the drawings said magnetized object simulates a ship, and movement of the globe causes it apparently to slide over the surface of the earth.

In order that it may be impossible for ship 10 to travel over any except the water-simulating surface of the globe, we throw the land part thereof into high relief, as shown, so that it will constitute a stop to the travel of the ship. Even though the ship should be attracted onto the land surface, the distance from the magnet is thus increased to such an extent that the attractive force of the latter is of no effect, and the ship will fall off. If the object 10 represented some land traveling object, of course, a different arrangement would have to be made.

Obviously the device described, while of use as a toy, is also a very excellent illustration of certain principles of physics, as well as an aid in the teaching of geography.

It may be noted that the form of magnet employed may be changed, as also that of the supporting member, though means should be provided for maintaining the effective end of the latter in some constant position, preferably at the top of the globe.

As many changes could be made in the above construction and many apparently widely different embodiments of this invention could be made without departing from the scope thereof, it is intended that all matter contained in the above description or shown in the accompanying drawings shall be taken as illustrative, and not in a limiting sense.

It is also to be understood that materials, sizes, and relativities of parts are unimportant, except as they are called for in the following claims, which define the scope of invention contemplated.

Having thus described our invention, what we claim as new and desire to secure by Letters Patent, is:

1. In a device of the kind described, a hollow globe having geographical markings on its outer surface, a hollow hemispherical magnet support within said body, regularly spaced depressions being formed in the outer surface of said support, antifriction balls within said depressions adapted to bear against the inner wall of the hollow globe, ballast carried within the hemispherical support at a point farthest from the edge thereof, a magnet located in said support and embedded in said ballast, and a keeper for the magnet located on the outside of said globe.

2. In a device of the kind described, a hollow globe having geographical markings on its outer surface, a hollow hemispherical magnet support within said body, regularly spaced depressions being formed in the outer surface of said support, antifriction balls within said depressions adapted to bear against the inner wall of the hollow globe, ballast carried within the hemispherical support at a point farthest from the edge thereof, a magnet on said support held in place by said ballast, and a keeper for the magnet on the outside of the globe, portions of the outer surface of the globe being in high relief.

3. In combination with a hollow shell or globe, a magnet carried by a relatively heavy base having smooth and rounded bearings or supports on its under face, substantially as described.

In testimony whereof we affix our signatures in the presence of two witnesses.

JOHN F. SHERLOCK.
HENRY SPENGLER.

Witnesses:
FRANK J. KENT,
ADÈLE HONIGSBERG.